United States Patent Office 3,326,309
Patented June 20, 1967

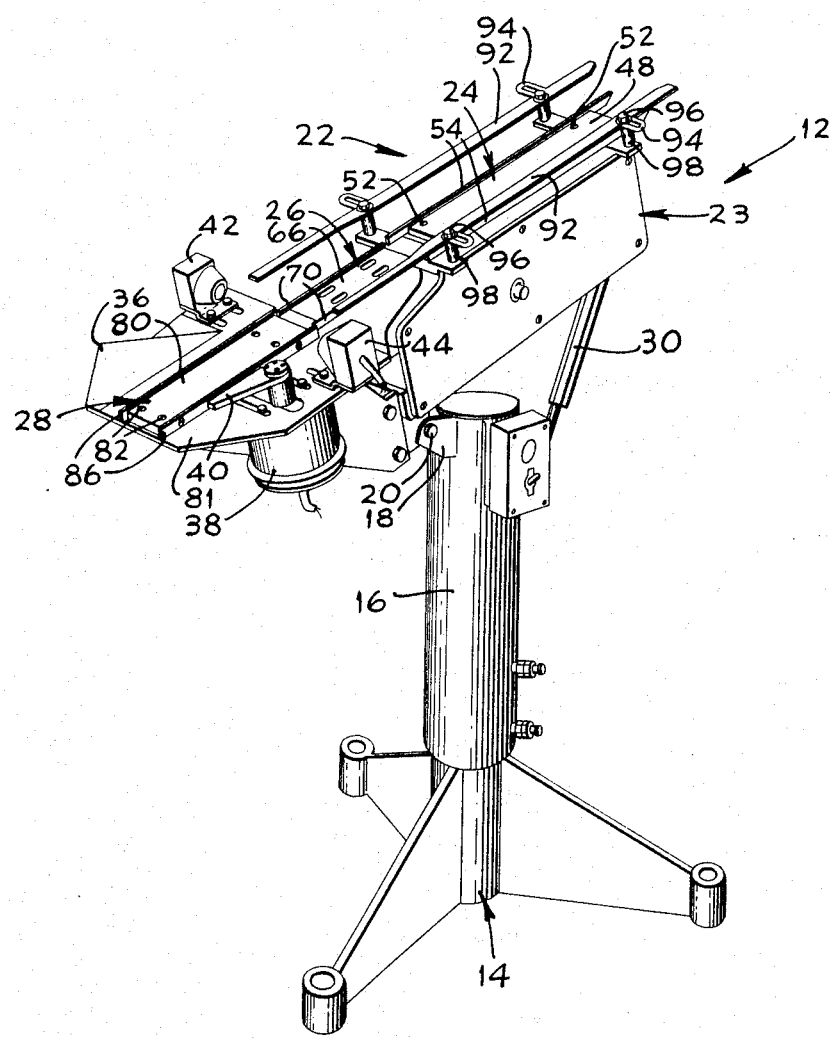

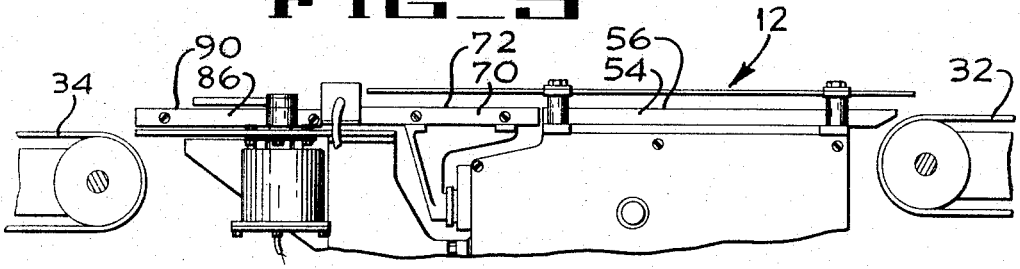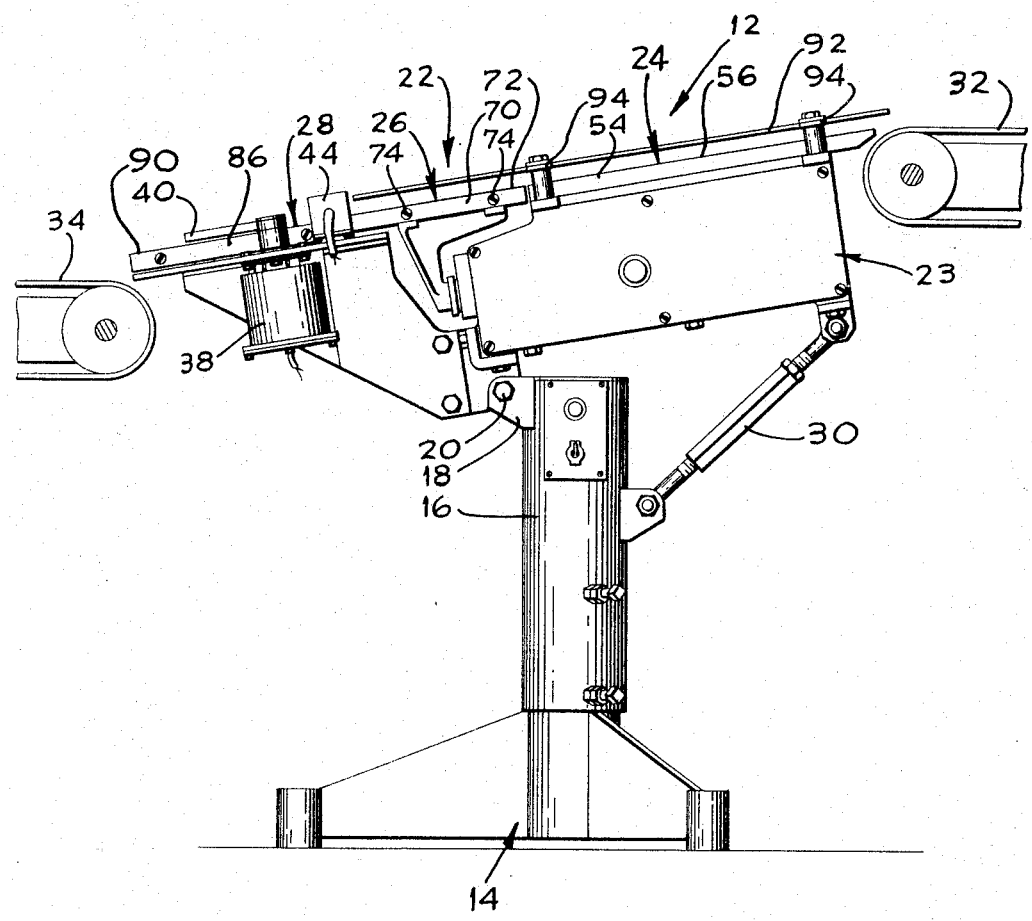

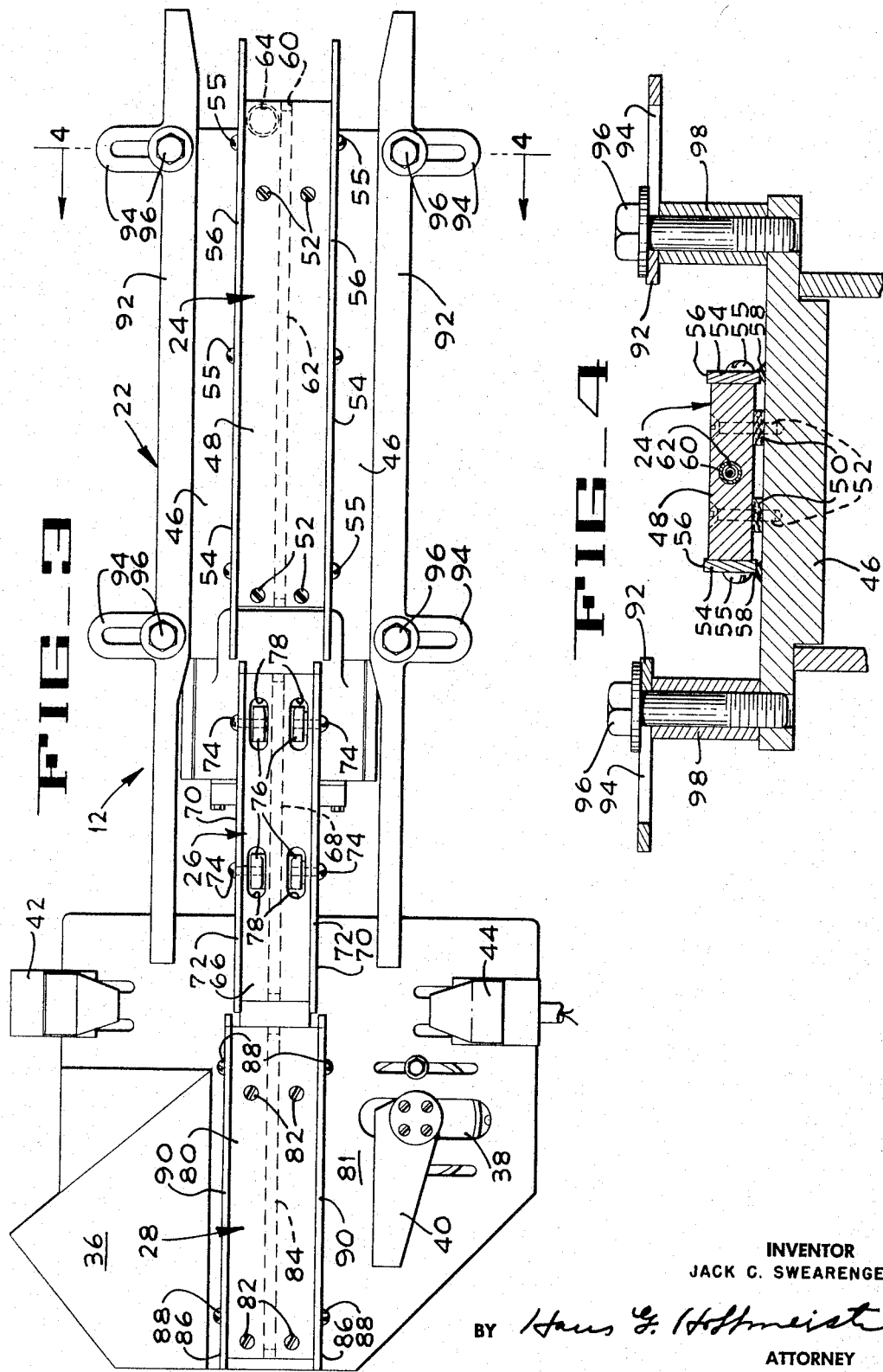

3,326,309
METHOD OF AND APPARATUS FOR CONVEYING WAXED ARTICLES
Jack C. Swearengen, Santa Clara, Calif., assignor to FMC Corporation, San Jose, Calif., a corporation of Delaware
Filed Oct. 11, 1965, Ser. No. 494,322
16 Claims. (Cl. 177—1)

The present invention pertains to a method and apparatus for sorting articles according to weight. More particularly, this invention concerns an improved conveyor for a weighing machine and an improved method of conveying and weighing articles having surfaces coated or impregnated with a material which becomes more lubricous when heated.

The present invention involves apparatus that may be incorporated in the apparatus disclosed in the copending application of Seaborn et al., Serial No. 325,097 for Article Sorting Assembly. The copending application is assigned to the same assignee as the present invention, and is incorporated by reference in the present application.

In the sorting machine disclosed in the above-identified Seaborn et al. application, a single file of articles, such as cans or jars, is continuously moved by gravity down inclined support rails associated with consecutive, substantially coplanar article support elements which provide an approach platform, a scale platform, and a reject platform. The articles traverse the approach platform and are weighed on the scale platform. If the article deviates from a given weight standard, it is moved by reject mechanism laterally from the otherwise linear flow path of the articles.

While glass jars, metal containers and various plastic packaging materials have a sufficiently low coefficient of friction relative to the support rails to ensure their rapid and continuous movement along the rails, waxed paperboard cartons may either initially bind on the rails due to the relatively gummy wax deposit on the cartons, or eventually cause the accumulation of a layer of wax on the rails that will arrest free motion of the cartons. The present invention eliminates the problem of gravitationally moving waxed cartons or other waxed containers in the above-identified apparatus, and precludes wax from accumulating on the support rails. While the invention is specifically intended for use with said apparatus, in its broader aspects the invention is useful for any slide conveyor, inclined or not, handling articles impregnated with or having wax coatings or other coatings which have lower coefficients of friction when increased in temperature.

An object of the present invention is to provide an improved method of conveying articles which are impregnated with a material or have a coating of wax or other substance which becomes slippery when heated.

Another object of the invention is to provide improved apparatus for conveying waxed articles.

Another object is the provision of apparatus for inhibiting the tendency of waxed articles to stick to an article support. Other objects are to provide a method and an apparatus for more accurately weighing articles coated or impregnated with a material which becomes more lubricous when heated.

Further objects and advantages of the present invention will be apparent to those skilled in the art from the following description and from the accompanying drawings, wherein:

FIGURE 1 is a perspective of a sorting apparatus incorporating the present invention.

FIGURE 2 is a side elevation of the apparatus shown in FIGURE 1, together with portions of delivery and discharge conveyors which may be used in conjunction therewith.

FIGURE 3 is an enlarged fragmentary plan of the article sorting machine of FIGURE 1.

FIGURE 4 is an enlarged fragmentary transverse section taken along lines 4—4 on FIGURE 3.

FIGURE 5 is a fragmentary side elevation of a modified form of the apparatus shown in FIGURE 2.

Briefly, the article sorting machine 12 (FIGS. 1 and 2) includes a pedestal base 14 having an upper sleeve portion 16 that can be elevationally adjusted. The sleeve 16 has spaced lugs 18, only one of which is shown, that carry a pivot bolt 20. Pivotally mounted on the bolt 20 is a unitary sorting apparatus 22 which includes a scale housing 23 on which are mounted an approach platform 24, a scale platform 26 and a reject platform 28. Thus mounted, the sorting apparatus 22 can be pivoted to various angular declinations, and locked in a selected position, by means of a sleeve and bolt assembly 30 which can be varied in length and interconnects the sleeve 16 and the scale housing 23.

As installed, the article sorting machine 12 may be positioned between the discharge end of a delivery conveyor 32 and the inlet end of a discharge conveyor 34, and the articles to be weighed and sorted slide by gravity successively over the approach platform, the scale platform and the reject platform.

Those articles which meet the weight standard for which the scale platform is adjusted slide onto the discharge conveyor 34 for further processing such as labeling or packaging. Articles which do not comply with the weight standards are pushed laterally over a slide plate 36 by a reject mechanism including a rotary solenoid 38 and an arm 40 which is connected to the actuating shaft of the solenoid and is movable over the reject platform 28 in a plane including an article on the platform. Timing of the actuation of the solenoid 38, and other functions, is effected by a scanning projector 42 and receiver 44. All of the above mentioned elements are more fully described in the previously identified patent application.

The present invention includes a carton transfer method, and the specific construction and operation of the approach platform 24, the scale platform 26 and the reject platform 28, whereby the support surfaces for the articles to be sorted are heated. The heat provides a melted film of wax beneath the previously difficult to handle waxed paperboard type of carton so that the carton slides freely across the platforms without exhibiting its former tendency to stick to the carton support surfaces.

More specifically, and with reference to FIGURES 3 and 4, the approach platform 24 is mounted on a base plate or top plate 46 of the scale housing 23 and includes a relatively thick metallic heater bar 48 which is preferably formed of brass, aluminum or copper, and is arranged to be electrically heated in a manner later described. The heater bar 48 is spaced from the top plate 46 by a fiber heat-insulating washers 50 and is secured by machine screws 52 which extend through the heater bar, the washers, and are threaded into the top plate. The screws 52 are preferably made of stainless steel or some other material which is also a poor conductor of heat. A metallic carton support rail 54 is secured in heat-conducting relation to each side surface of the heater bar by screws 55. The rails 54 may be formed of brass, aluminum or copper to provide rapid heat transfer from the heater bar 48. The narrow upper side of each rail provides a small-area carton support surface 56, and extends higher than upper surface of the heater bar 48 so that the bottom wall of a carton supported on the rails 54 will not contact the heater bar.

The bottom side of each rail is spaced from the top plate 46 (FIG. 4) and the intervening space is sealed with heat resistant silicone rubber at 58. The end portions of the heater bar 48 are similarly sealed to the top plate 46. Such sealing prevents the intrusion of any foreign matter which might create conditions not consistent with the high standards of sanitation required in food processing plants, and provides a dead-air insulation that helps to conserve heat in the heater bar 48. A suitable rubber compound is that manufactured by the Silicone Products Department of General Electric Company, Waterford, N.Y., and is marketed under the designation RTV 102.

Extending centrally and longitudinally through the heater bar 48 is an aperture 60 in which is mounted an electrical resistance heating element 62 of the enclosed tubular type, such as those marketed under the trademark Calrod and comprising a tubular metal outer shell and a filling of magnesium oxide which insulates a central resistance-heated nichrome wire. The heating element 62 is shorter than the heater bar 48 and the aperture 60 at each end of the heating element is plugged with silicone rubber compound. The lead wires, not shown, for the heating element 62 are connected to a source of electrical power through a conventional thermostat 64 (FIG. 3) which is mounted at one end portion of the heater bar 48. Thus controlled, the heating element 62, and other heating elements later mentioned, are periodically energized to maintain the carton support surfaces 56 of the support rails 54 at a temperature above the melting temperature of the wax on the particular cartons to be handled, for example, about 150° F.

The construction of the scale platform 26 and the reject platform 28 (FIG. 3) is essentially the same as the described construction of the approach platform 24. Thus the scale platform includes a heater bar 66 enclosing an electrical resistance heating element 68, and is provided with a pair of carton support rails 70 that are arranged to be heated to about the same temperature as the carton support rails 54. As in the case of the heater bar 48 and the rails 56, the heater bar 66 and rails 70 are preferably formed of brass, copper or aluminum so that they will rapidly heat to the proper operating temperature.

The upper carton support surfaces 72 of the carton support rails 70 are always in or below coplanar relation to the carton support rails 54 so as to provide free transfer movement of cartons from the latter to the former carton support rails. Means for mounting the heater bar 66 to the scale mechanism, not shown, and for mounting the carton support rails 70 to the heater bar 66 is provided by machine screws 74. Each screw is threaded into an upstanding boss 76 of the scale platform 26, the bosses being disposed in corresponding apertures 78 of the heater bar 66.

The construction of the approach platform 24 is also typical for the reject platform 28, the latter of which includes a heater bar 80 that is secured in spaced relation to an underlying plate 81 by stainless steel machine screws 82, and by fiber spacing and insulating washers that are hidden by the heater bar. An electrical resistance heating element 84 extends through the heater bar 80 and is arranged to conductively heat a pair of carton support rails 86 that are secured by screws 88 to the sides of the bar. The carton support surfaces 90 of the carton support rails 86 are maintained at about the same temperature as the carton support surfaces 56 and 72 because all of the heating elements 62, 68 and 84 are controlled by the same thermostat 64.

It is apparent that to achieve the same, or substantially the same, degree of heat in all of the carton support rails, the heating elements 68 and 84 can be of about the same wattage rating, but that the heating element 62 should preferably be of higher wattage rating due to the larger radiating surface of its heater bar 48. In any event, precise heat control of the carton support surfaces 56, 72 and 90 is not critical, the major requirement being that these surfaces maintain a temperature in excess of the melting point of the wax on the cartons to be sorted. This temperature, or temperature range, is obviously governed not only by the melting temperature of the wax, but also by the speed at which the cartons are handled and the recovery rate of the heating elements, because some heat is transferred to each passing carton.

As a general example of the operating efficiency achieved with the article sorting machine 12, waxed cartons within the range of from three ounces to five pounds each can be handled at speeds up to 300 cartons per minute. The only required adjustment for handling different sizes of cartons is that a pair of guide rails 92 be positioned so as to be equally spaced from the longitudinal centerline of the machine, and spaced apart a distance slightly greater than the width of the carton. For this purpose the guide rails are provided with lateral slotted tabs 94, through which their mounting bolts 96 extend. The bolts 96 are threaded into the top plate 46 and the guide rails 92 are spaced therefrom by sleeves 98.

It will be evident that by providing additional sleeves at each bolt location, and by using longer bolts, that additional guide rails can be mounted as needed to handle exceptionally tall cartons. In this regard it should be mentioned that, if desired, portions of the guide rails 92 can also be heated so that the cartons will not tend to bind on the rails. Those portions of the guide rails which straddle the scale platform 26 are offset in the same manner as previously employed so that the cartons lose contact with the guide rails immediately before they are subjected to the weighing operation.

The modified form of the apparatus shown in FIGURE 5 concerns only the positions of the sorting machine 12, the delivery conveyor 32, and the discharge conveyor 34. Thus, the sorting machine 12 and the conveyors 32 and 34 are positioned so that their respective carton support surfaces are both horizontal and coplanar. In such position, gravity does not impart any forward motion to the cartons, and conveyance of the articles across the heated carton support surfaces 56, 72 and 90 is provided by driving the delivery conveyor 32 at a speed imparting sufficient momentum to the article to carry it across the heated support surfaces.

During the operation of the article sorting machine 12, the heating elements 62, 68 and 84 are energized before the waxed cartons are fed in so that the carton support rail surfaces 56, 72 and 90 attain a temperature in excess of the melting point of the wax on the cartons. All of the heating elements are controlled by the thermostat 64 to maintain such temperature, allowing for the lost heat which will be transferred to the cartons, and other factors. As each carton is deposited upon the approach platform 24 from the delivery conveyor 32, its waxed bottom surface contacts the heated support surfaces 56 and a thin film of wax is immediately melted whereby the carton slides, with minimum friction because the melted wax film is an excellent lubricant, over the successive heated support surfaces 56, 72 and 90. If the carton reject arm 40 is actuated to push a rejected carton laterally from the support surfaces 90 onto the slide plate 36, the same advantages obtain; the heated wax film between the carton and the support surfaces 90 assure lateral movement of the carton with minimum friction.

Although it is not usually a consideration with waxed cartons, it may be that some cartons do not have sufficient wax to traverse carton support surfaces which are in alignment. In such event it will aid in conserving the wax if the support surfaces are not in alignment, as is shown in FIGURE 3 for the support surfaces 56 and 72 of the approach platform 24 and the scale platform 26, respectively, so that different areas of the carton contact successive support rails.

The disclosed method and apparatus concerning heated support surfaces for a slide conveyor handling waxed paperboard cartons, or other articles coated or impregnated with a material which becomes more lubricous when heated, has solved an outstanding problem in an inexpensive and efficient manner in that the components are readily obtainable and have a prolonged service life without any maintenance. Having thus described the invention, that which is believed to be patentable, and for which protection by Letters Patent is desired, is:

1. In an article handling apparatus including means for weighing an article, means for supporting the article while on said weighing means, conveying means for feeding an article to said weighing means, means for receiving the article from said weighing means, and means for heating the supported surface of the article as it moves over said supporting means whereby an article having a layer, covering its supported surface, of a material which becomes more lubricous when heated will slide freely on said supporting means.

2. Apparatus according to claim 1 wherein said article supporting means includes a relatively large metallic heater bar arranged to be heated by said heating means, and further includes an upwardly facing support rail in heat conducting relation with said heater bar.

3. Apparatus according to claim 2 wherein said heating means comprises an electrical resistance heating element mounted within said heater bar.

4. The apparatus defined by claim 1 wherein said article supporting means is inclined with respect to the horizontal.

5. The apparatus defined by claim 1 wherein said article supporting means includes two sets of longitudinal rails, one set being spaced laterally of the other set whereby the article is contacted at different locations on its supported surface as it passes from one set of rails to the other.

6. The apparatus defined by claim 1 wherein said supporting means is heated whereby the supported surface of the article is heated by contacting said supporting means.

7. The apparatus defined by claim 1 wherein said conveying means for feeding the article to said supporting means imparts a velocity to the article to give the article sufficient momentum to carry it over said weighing means and onto said receiving means.

8. The apparatus defined by claim 7 wherein said article supporting means includes two sets of longitudinal rails, one set being spaced laterally of the other set, and said heating means includes means for heating said rails.

9. Article handling apparatus for conveying articles having a coating whose outer surface frictional resistance diminishes when heated above ambient temperature comprising base plate means, supporting means fastened on said base plate means and having an article support surface raised above said base plate means, means for heating said support surface to a temperature above ambient temperature, means for propelling an article onto said support surface with momentum sufficient to carry the article across heated support surface, and means for receiving the article from said support surface.

10. Apparatus according to claim 9 wherein said article supporting means is formed of a plurality of rails having substantially planar upper surfaces forming said support surfaces, said rails being in lateral misalignment so that each article is contacted in different areas as it traverses said rails.

11. A method of conveying articles in a weighing machine, which articles have outer surfaces coated or impregnated with a material that has a frictional resistance that decreases with an increase in temperature, comprising the steps of moving the articles along a supporting surface and heating the outer surfaces of the articles engaged by the supporting surface while they are moved along said supporting surface whereby the frictional resistance of the material is reduced to assist in the movement of the articles.

12. The method defined by claim 11 wherein the material is heated to a temperature of about 150° F.

13. The method defined by claim 11 further including the step of weighing the articles as they move along said supporting surface.

14. The method defined by claim 12 further including the step of weighing the articles as they move along said supporting surface.

15. The method defined by claim 11 wherein the material is wax and the wax is heated to a temperature just above its melting point.

16. A method of reducing friction between an article having a coated surface which becomes slippery when heated and a conveying surface comprising the steps of sliding the article onto and across the conveying surface, heating the coated surface supported by the conveying surface to a temperature approximately equal to the melting point of the coated surface.

References Cited
UNITED STATES PATENTS

| | | | |
|---|---|---|---|
| 2,784,563 | 3/1957 | Baker | 62—351 |
| 2,945,938 | 7/1960 | Alvord | 219—214 |
| 3,064,783 | 11/1962 | McClelland | 193—38 |
| 3,064,959 | 11/1962 | Eisenberg | 263—32 |

EVON C. BLUNK, *Primary Examiner.*

RICHARD E. AEGERTER, *Examiner.*

UNITED STATES PATENT OFFICE
CERTIFICATE OF CORRECTION

Patent No. 3,326,309            June 20, 1967

Jack C. Swearengen

It is certified that error appears in the above identified patent and that said Letters Patent are hereby corrected as shown below:

Column 6, line 4, after "across" insert -- said --; line 37, before "heating" insert -- and --.

Signed and sealed this 15th day of July 1969.

(SEAL)
Attest:

Edward M. Fletcher, Jr.            WILLIAM E. SCHUYLER, JR.
Attesting Officer            Commissioner of Patents